United States Patent [19]

Broad

[11] 4,159,860
[45] Jul. 3, 1979

[54] HIGH VOLTAGE CABLE COUPLER WITH TERMINATION ADAPTOR

[75] Inventor: Roy M. Broad, San Carlos, Calif.

[73] Assignee: The Scott & Fetzer Company, Cleveland, Ohio

[21] Appl. No.: 743,054

[22] Filed: Nov. 17, 1976

Related U.S. Application Data

[60] Continuation of Ser. No. 577,439, May 14, 1975, abandoned, which is a division of Ser. No. 403,455, Oct. 4, 1973, Pat. No. 3,932,933.

[51] Int. Cl.² .................................................. H01R 13/52
[52] U.S. Cl. ................................ 339/60 M; 339/143 R; 339/258 P; 339/DIG. 3; 174/73 R
[58] Field of Search ............................... 339/59–63, 339/94, 111, 143, 186, 256, 258, DIG. 1, DIG. 3; 174/73 R, 73 SC

[56] References Cited

U.S. PATENT DOCUMENTS

| | | | |
|---|---|---|---|
| 3,127,291 | 3/1964 | Betz et al. | 174/73 R |
| 3,157,450 | 11/1964 | Harrison, Sr. et al. | 339/94 M |
| 3,287,031 | 11/1966 | Simmons et al. | 339/186 R |
| 3,352,962 | 11/1967 | Brown et al. | 174/73 R |
| 3,453,587 | 7/1969 | Freidecker | 339/256 RT |
| 3,517,113 | 6/1970 | Ono et al. | 174/73 R |
| 3,614,711 | 10/1971 | Anderson et al. | 339/186 M |
| 3,778,888 | 12/1973 | Clason | 174/73 R |
| 3,784,729 | 1/1974 | Davis et al. | 339/61 R |
| 3,851,296 | 11/1974 | Muchmore et al. | 339/DIG. 1 |

FOREIGN PATENT DOCUMENTS 6600397 7/1967 Netherlands ..................... 339/61 M

*Primary Examiner*—Joseph H. McGlynn
*Attorney, Agent, or Firm*—Carothers and Carothers

[57] ABSTRACT

A high voltage cable coupler for releasably connecting together one or more high voltage cables having a concentrically located insulated conductor bounded by a semiconductive and/or metallic shield. The cable housing is provided to be in two moisture-proof halves, one-half for supporting the female connector assembly and the other half for supporting the male connector assembly. Each cable terminus includes a cable termination adaptor which provides a stress relief cone as well as insulative means in combination with an insulator tube assembly within which the conductor connector is secured. This combination also provides for proper positioning and support of the adaptor assembly within the housing as well as providing definitive means for the relationship separation of the termination of the cable shielding and the conductor connector which has an influence on the resultant creepage path.

The adaptor is made of elastomeric material and is provided with an integrally bonded semiconductive layer on the stress relief cone area, the largest diametrical extent of which is provided with an annular flange. The semiconductive layer is feathered at its outer extents in that it diminishes in layer thickness to be contiguous with the insulative portion of the stress relief cone at the other end. The structure of the adaptor is particularly suited for constructing high voltage cable terminations free of voids or air pockets particularly where it is used in the field.

25 Claims, 11 Drawing Figures

HIGH VOLTAGE CABLE COUPLER WITH TERMINATION ADAPTOR

CROSS REFERENCE TO RELATED APPLICATION

This application is a continuation of application Ser. No. 577,439 filed May 14, 1975, now abandoned which is a division of application Ser. No. 403,455 filed Oct. 4, 1973 in Group 213, now U.S. Pat. No. 3,932,933, in the name of Roy M. Broad for High Voltage Cable Coupler With Termination Adaptor and Method of Constructing Cable Termination, now pending.

BACKGROUND OF THE INVENTION

This invention relates generally to high voltage cables and insulators therefor employed in connection with cable termination and splicing or cable coupling and joining and more particularly to cable termination adaptors and their employment in cable couplers and the method of constructing the cable termination.

It is well known that the termination or jointure of high voltage shielded cables presents problems relating to the formation of corona and high concentration of electrical stresses. Cable termination by its nature necessitates the stripping of the cable's outer conductive layers as well as a portion of the conductor insulation for connection to an electrical contact or connector for ultimate communication with another contact or connector of another permanently joined or releasably coupled cable. Many methods of cable termination have been developed employing various types of termination adaptors having a stress relief cone, special conductor connectors, conductive inserts for termination adaptors, semiconductive shielding by means of coating or taping, etc., all aimed at redistribution of electrical stresses formed at the cable termination and thereby reducing the chances of corona formation and eventual breakdown of the insulation at the point of termination.

Many attempts have been made to eliminate as much as possible localized air pockets or voids anywhere along the cable terminus so as to reduce chances of the development of corona, that is, the ionization of air or gas entrapped within the elements making up the cable termination thereby initiating a discharge which will eventually break down the termination insulation causing cable failure. A side effect is the production of ozone which hastens the breakdown process of dielectric materials in the area of the cable terminus. By redistribution of the electrical stresses developed at the cable terminus, high stress areas can be effectively reduced to a point where the chance for development of corona at normal specified margin above operating levels is very minimal. This marginal level may be referred to as the corona extinction level, that is, the voltage level below which corona disappears, having established the actual voltage level at which corona is present. In actual practice, corona may be experienced during a voltage excursion resulting from a transient surge or fault condition.

Cable terminus in the past has always been with the objective of increasing the dielectric thickness of the cable adjacent the point where the cable shielding over the insulated conductor is actually terminated. This dielectric buildup usually takes the form of a cone and has the effect of redistributing the electrical stress concentration, that is, the concentration of the electrical field at the terminus to reduce the possibility of corona discharge and ultimate dielectric failure of the cable. Thus, a divergent potential gradient is introduced at the dielectric buildup area. The shield, in such cases, is effectively extended to end or terminate somewhere along the buildup area or cone so as to have a larger diametrical extent than that of the shielded cable.

The dielectric buildup was originally provided by means of a multiple layer of dielectric tape which was hand-wrapped on cable terminus. Also, self-bonding tape and different types of insulating gels and epoxies were used in an attempt to make the tape wrappings air-tight. Since these enlarged dielectric areas are generally done by hand in the field, it is virtually impossible to produce a completely air-tight, no-void terminus with multiple layers of wrapping tape, since the construction of the terminus depends largely upon workmanship and experience of the individual constructing the cable termination.

Premolded stress relief cones have since come into existence to eliminate problems brought about by multiple layer tape wrapping and further reduce the possibility of constructing a cable terminus with undesirable voids or air pockets which are most frequently present at surface irregularities along various dielectric layers making up the stress cone.

However, problems still remain with the expertise needed to produce a void-free cable termination since the skill developed through experience in using premolded adaptors is the main factor in determining the life of the cable connection until dielectric breakdown might possibly occur. Also, problems with such adaptors have been experienced with regard to tolerances of the internal bores of the semiconductive and insulative portions of such adaptors relative to the shielded insulated conductors upon which the adaptor is inserted. If there is too much tolerance, air pockets may be present either in the semiconductive or insulative portions of such adaptors. If there is too little tolerance, it becomes very difficult, if not impossible, to work the insulated conductor into the adaptor, whereas if it is simple to slide or insert the insulated conductor into the adaptor, it may be possible to slide the adaptor up over the semiconductive shielding covering the insulated conductor thereby creating an undesirable void in that region.

In high voltage cables where the insulation covering the conductor is comparatively thick, eccentricity of the insulation about the conductor is readily discernible and can give rise to problems in cable termination. The occurrence of eccentricity is particularly inherent in tandem extruded cables consisting of semiconductive layer, insulation and outer semiconductive jacket.

The extruded insulation and outer jacket of the cable are basically circular. However, the outer cylindrical surface of the cable is not concentric relative to the centrally located conductor. Thus, in employing a cable tool to remove out cable layers such as the outer semiconductive layer, more cable insulation will also be removed from one quadrant or side of the cable compared to the other in insuring no semiconductive material is left on the surface of the conductor insulation. This is because the cable conductor is concentrically located relative to the outer cable layers. By removing more of the insulation from one cable quadrant as compared to another because of this eccentricity, it will be evident to those knowledgeable in the high voltage cable termination art that a "step" or shoulder will be inevitably produced between the surface or the insulated conductor and the terminus of the outer semiconductive shield, which step or shoulder will also include in that one quadrant a contiguous "insulation step" which interferes with good cable termination. This is because the many termination adaptors of the prior art are employed concurrently with the formal shoulder giving rise readily to the formation of a "corona pocket" or region where corona can develop across a formed gap between the contiguous insulation step and the semiconductive position of the termination adaptor. Pencilling of this shoulder has been suggested which would require a termination adaptor of a different design.

In particular, if anything, the use of premolded adaptors may have created problems in producing rims, edges or shoulders with contiguous portions of the insulated conductor providing invitation to produce voids or air spaces in preparing or otherwise constructing a cable terminus. For example, U.S. Pat. No. 3,352,962 recognized the problem of entrapped air between the adaptor and the insulated conductor no matter how tight the relationship so that an annular cavity was provided to place any such entrapped air all in one location between the semiconductive adaptor and the insulated conductor. However, the problem of entrapped air within the cable terminus is not completely solved but rather collected to reside at a particular point within the cable terminus, with the result that electrical stresses developed across the trapped air may be somewhat reduced. In fact, the problem is still present in those situations where the cable semiconductive and insulative layers are not concentric about the central conductor, discussed above, so that the trapped air actually exists in practice between the semiconductive portions of the adaptor and the insulative covering of the conductor.

Historically, stress relief cones or cable terminating adaptors in general have provided a semiconductive portion in physical contact with the cable shield or semiconductive layer and the conductor insulation for a short length of the cable to provide for shield or semiconductive layer connection and termination as illustrated in U.S. Pat. Nos. 3,243,756; 3,352,962; and 3,378,627. However, the employment of adaptors in this manner necessitates proper and uniform termination of these outer conductive cable layers and precise positioning of the adaptor relative to the cable terminus of the semiconductive or shielding layer. Furthermore, ribs or shoulders are present at the ends of such adaptors, as applied to the cable, as previously stated, inviting the possible inclusion of voids.

In the past, to eliminate the problems encountered by employing highly elastomeric adaptors as illustrated in these patents, some have chosen to employ fairly rigidly constructed adaptors so as to insure that the end of the adaptor would not ride up over the terminus point of the cable semiconductive layer, preventing the possibility of a void area in the region which can be easily produced with highly elastomeric type adaptors. However, the employment of such adaptors made of relatively rigid material in some instances has not been satisfactory because they have become cracked usually in a direction perpendicular to the base of the adaptor for a substantial length of the adaptor, particularly of the semiconductive portion of the adaptor. These cracked conditions are usually created when inserting the adaptor over the shielded cable causing the material to spread and tear or be placed under such continuous tension conditions, as applied to the insulated conductor, to later crack or tear apart.

Further, these outer conductive layers of the cable obviously have greater diametrical extent than the insulated conductor so that if the insulation covering of the conductor is out of round or not concentric, these outer layers will be even more so out of round relative to the central conductor, which will be particularly exaggerated in the large diameter cables of the high voltage type where the insulation thickness is necessarily greater such as in a 69 kv or 138 kv cable. This is undesirable at a point of cable terminus because the redistribution of the electric stress at this point will also not be accomplished in a uniform manner. Covering these layers with a portion of the bore of the termination adaptor would merely compound the problem of providing for more uniform distribution of electrical stresses.

Thus, what those skilled in the art have been striving for is to prepare and construct a high voltage cable terminus with the minimum of materials, labor and expertise in the field producing a void-free termination including the provision of (1) an effective electrical stress relief cone with continuous extension of the outer conductive layers of the cable upon the cone; (2) increased dielectric strength along inner and outer creepage paths; (3) uniform gradual increase of outer concentric conductive layers from the point of terminus of these layers on the cable outwardly along the taper of the stress relief cone; (4) tighter tolerance of taping, coating or tubing conductive and insulative layers between the adaptor and the cable terminus of these layers as stripped to produce a satisfactory corona extinction level; and (5) above all, a cable terminus which does not take the skill and experience developed by one over the years in the field but can be easily constructed with a minimum of experience because of the reduction or otherwise the elimination of probable points within the cable terminus for eventual development of corona and subsequent dielectric failure.

In other words, it is the long felt need in the high voltage cable termination art, whether for permanent cable jointure or releasable cable coupling, to remove the present criticalness of preparing cable terminations in the field so that a corona free terminus might be provided for with a minimum of necessary skill.

Mention has only been made thus far relative to cable termination. However, equally important in the case where two high voltage cables are to be joined or coupled together is providing for a moisture or atmospheric tight, shockproof but releasably connectable cable coupler. Cable couplers of the past have not provided for weather tight connection nor have they been provided to be shockproof, having been previously provided with glass polyester insulators. These cable couplers experience very rough treatment in the field and must be constructed to take a certain amount of misuse so that an effective atmospheric or weather seal as well as secure conductor connection is maintained in spite of abuse in the field. Also, if the coupler employing the glass polyester type insulator assembly is dropped or otherwise misused, any internal breakage or damage to the assembly would have disastrous electrical consequences.

Thus, there is a large desire in the high voltage cable art to improve present couplers toward the elimination of insulator assembly breakage, corona induced ozone attack, increase the extent of creepage paths to ground, provide insulator assembly having higher dielectric strength materials and in general, provide a coupler assembly having higher corona extinction levels particularly for higher voltage class cable systems.

SUMMARY OF THE INVENTION

The principal object comprising this invention is the provision of a high voltage cable coupler for releasably connecting together one or more high voltage cables wherein the cable-termini are provided with an improved cable termination adaptor employed in the construction of a void-free cable terminus at each cable end thereby achieving minimal voltage stress at known vulnerable areas within the cable termination while increasing the dielectric strength of the creepage path coverage.

A feature of the present invention is the provision of a high voltage coupler employing an improved cable termination adaptor which can be easily installed in the field without any special expertise and yet having improved electrical stress capabilities with less likelihood of any entrapped air spaces or voids being present in the cable termination as constructed.

The method for constructing the cable termination employing the adaptor comprising this invention takes the criticalness of positioning of the adaptor over the cable shield or semiconductive layer while physically locating the cable shield (ground potential) the proper distance from the conductor connector of the cable. Thus, it is not necessary to be overly concerned with the distance of stripping of these conductive layers from the insulated conductor, as the method of cable termination disclosed requires a portion of exposed insulated conductor between the terminus of these layers and the stress cone end of the termination adaptor. The length of the exposed insulated conductor surface is indeed not critical but certainly it should not be too extensive. In the usual situation, this exposed portion may be five centimeters or less.

On the other hand, a highly corona-free joint can still be made between the terminus of the semiconductive layer of the cable and the termination adaptor in contiguous relationship if the conductor connector can also be properly connected. Final connective coupling between the adjacent semiconductive materials could be accomplished by semiconductive tape wrapping or the employment of an elastomeric band expanded to fit and then resiliently retracted tightly into position over the juncture.

Mention should be made at this point that the coupler, adaptor and method of cable termination herein disclosed can be readily applied to any high voltage cable, whether it have just single outer conductive shielding or an outer conductive shielding and an inner annularly adjacent semiconductive layer. In many cable terminations these two conductive layers are present and therefore discussion of the preferred embodiments will cover this type of cable structure. However, it should be clearly understood that the invention as claimed herein including the employment of the adaptor as described can be employed on other structures including but not limited to high voltage cable of any type, apparatus bushings such as in transformers and switch gear. The method could also be as easily applied to high voltage cables having more than one semiconductive layer as will be obvious from the discussion below relating to the method of constructing or preparing a cable termination.

Also, mention should be made that the method of termination or the employment of the adaptor comprising this invention are not limited to cable coupling structures of the type disclosed in the preferred embodiments. The method and adaptor may be employed as well in connection with cable terminators, splices or permanent joints, that is, in any situation involving high voltage cable termination and the necessity of a shielded electrical connection with proper electrical stress relief regions.

Another feature of the present invention is the provision of a cable termination employing an improved coupler and cable termination adaptor that provides adequate dielectric strength, withstand voltage, basic impulse, and corona extinction levels, even with comparatively carefree installation. The insulator and adaptor assembly provides a sufficient creepage path to ground to facilitate a flashover voltage well in excess of recognized minimum requirements.

A further feature of the present invention is the provision of a high voltage cable termination adaptor having one frusto-conical portion made of elastomeric insulative material with a single central bore forming a stress cone wherein there is provided on the frusto-conical surface a semiconductive elastomeric layer integrally bonded thereto. The largest diametrical extent of the frusto-conical portion is provided with an annular insulative flange performing four main functions: first, it provides for a diverted external creepage path; secondly, it provides a means to automatically predefine the precise location of the stress relief cone relative to the conductor connector; third, it provides for a contiguous integration with the semiconductive layer so that the outer surface of the cone including the flange surface is smoothly connected and constructed void-free; and fourth, and very important, the flange improves the overall redistribution of the electrical stress within the cone.

A modified feature of the present invention is the provision of a termination adaptor of the type just explained but also including an outer frusto-conically shaped insulative layer integrally bonded to the semiconductive elastomeric layer thereby providing for higher corona extinction level and an increased external creepage path resulting in higher external flashover voltage values.

It is of much importance that the semiconductive layer at its upper annular extent "feather" into the annular flange located at the largest diametrical extent of the adaptor so as to form a uniform contiguous surface therebetween. Also, at the smallest diametrical or terminal extent of the layer may "feather" into the insulative conical portion of the adapter adjacent the central bore but preferably diminishes to a point beyond the terminal extent of the insulative conical portion. The semiconductive layer in its preferred form is provided for the full extent of the stress cone but terminates in thickness in a diminishing manner on the stress cone so that the end portion or furthest tip of this layer is in engagement with the conductor insulation when the adaptor is positioned on the insulated conductor.

Another feature of the termination adaptor is the provision of a second, oppositely opposed frusto-conical portion integral with the first-mentioned frusto-conical portion and made of elastomeric insulative material provided with a central bore concentric with the previously mentioned bore of the first adaptor portion. The largest diametrical extent of this second portion terminates at the annular flange of the stress cone. The tapered surface of this second portion is adapted to fit into engagement with a mating tubular insulator having a corresponding, mating tapered bore. The cable conductor with its connector is secured within these elements as assembled so that the adaptor flange in combination with the semiconductive layer provides not only improvements in the uniform distribution of electrical stresses but also physically locates in a predetermined or predefined manner the distance between the cable shield and the conductor or connector while at the same time increasing the outer creepage path along the interface defined between the tapered surfaces of the insulator and adaptor.

Mention should be made here that the adaptor herein disclosed can also be readily employed without any mating tubular insulator within a coupler as a stress cone assembly to provide a predetermined location with respect to the exposed conductor end.

BRIEF DESCRIPTION OF THE DRAWINGS

Other objects and advantages appear hereinafter in the following description and claims.

The accompanying drawings show, for the purpose of exemplification without limiting the invention or claims thereto, certain practical embodiments illustrating the principles of this invention wherein:

DETAILED DESCRIPTION OF THE PREFERRED EMBODIMENTS

Figure 1:
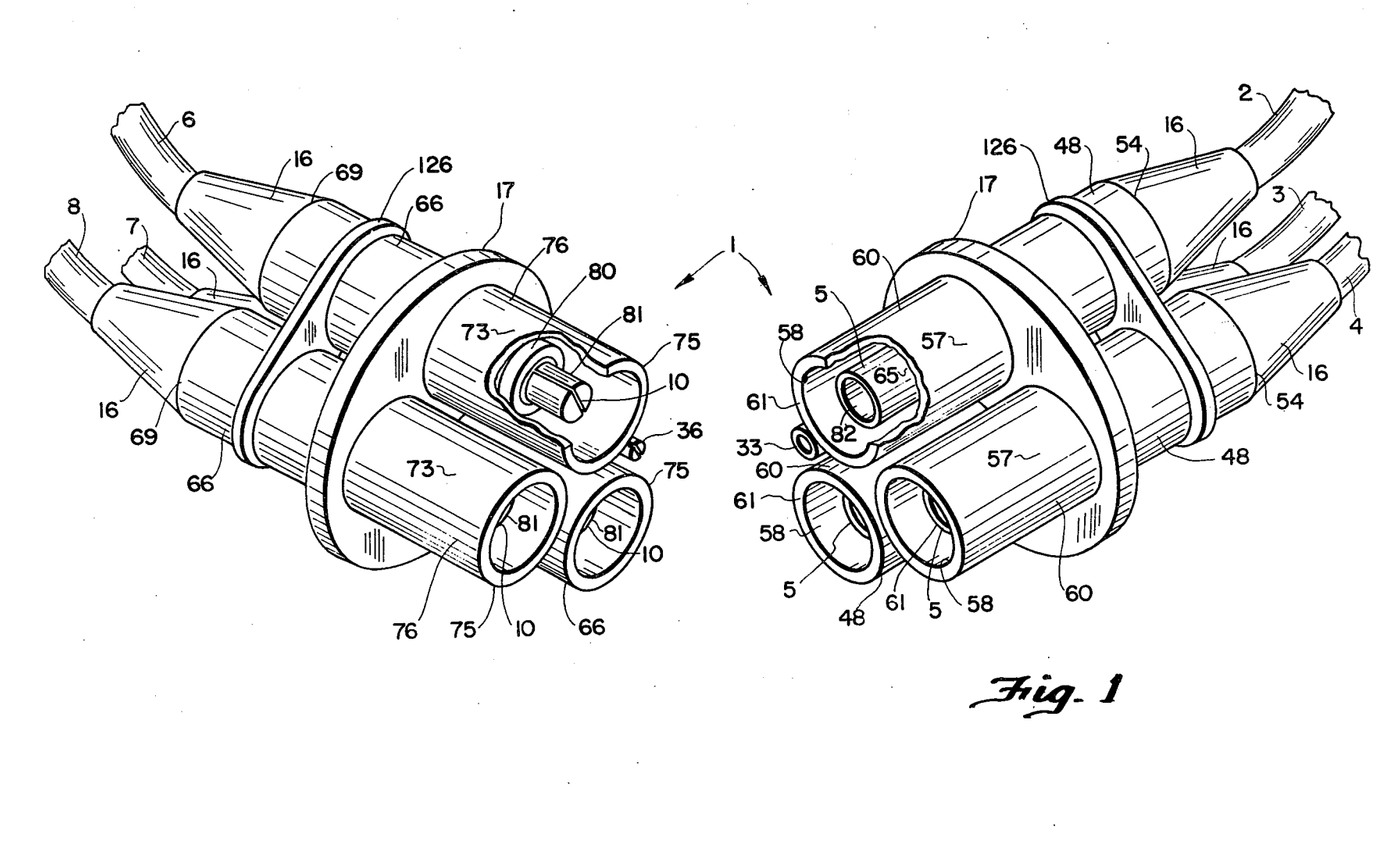
FIG. 1 is a perspective view of the male and female cable connection assemblies for a polyphase high voltage cable as mounted in their respective insulator assemblies.
Figure 2:
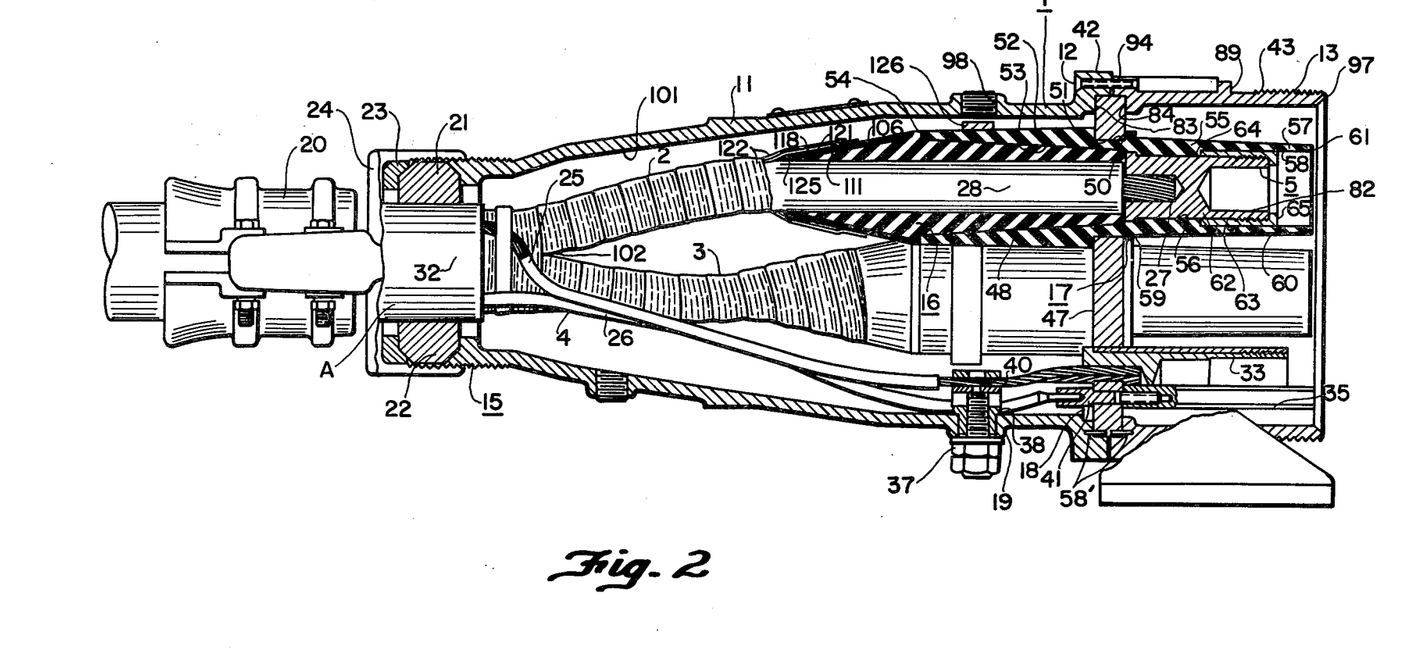
FIG. 2 is a longitudinal cross-sectional view of the female connecting portion of a high voltage cable coupler illustrating further in cross section the termination adaptor and insulator assembly comprising this invention.
Figure 3:
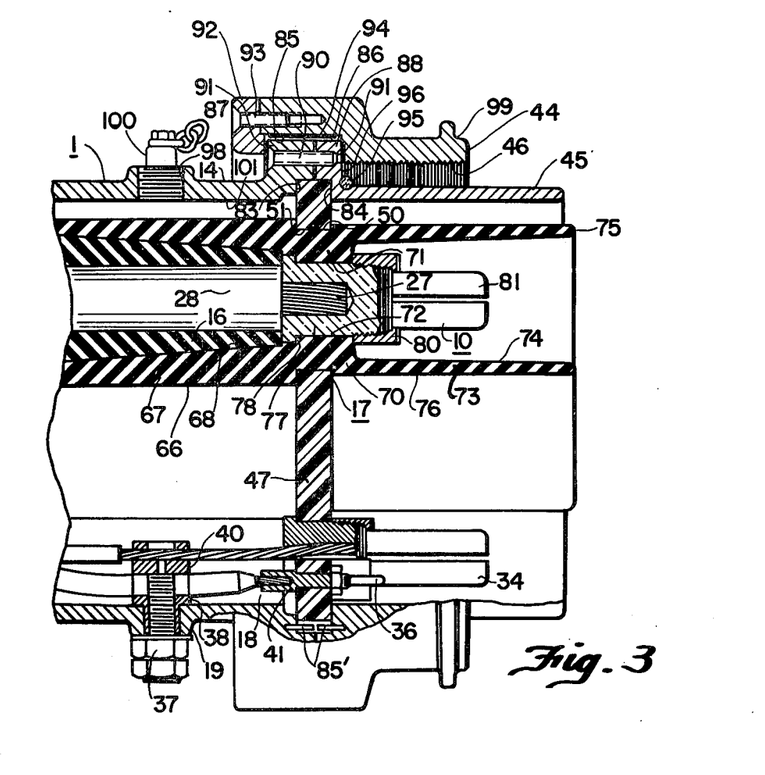
FIG. 3 is a partial sectional view of the connecting male portion of the high voltage cable coupler for coupling with the female coupler portions of FIG. 2.

Reference is now made to FIGS. 1 through 3 where there is shown the female and male portions of the high voltage cable coupler 1 for releasably connecting together one or more high voltage cables. In the particular illustration, three high voltage cables 2, 3 and 4 of a high voltage polyphase cable system A are shown connected to identical female phase contact or connector assemblies 5, whereas the corresponding polyphase cables 6, 7 and 8 of the system as shown in FIGS. 1 and 3 are provided with identical male phase contact or connector assemblies 10.

The male cable housing 14 and female cable housing 11 of the coupler 1 consist of substantial metallic bodies and have secured to their respective forward ends the female socket housing 13 (by means of the cap screws 12) and the male plug housing 45 (by means of the cap screws 90). The male and female housings are actually identical parts so that it is possible for plug housing 14 to be part of the female coupling assembly or the socket assembly to be part of the male socket assembly, as being the opposite to that shown in FIGS. 2 and 3.

In general, the female cable housing 11 of FIG. 2 as well as the male cable housing 14 of FIG. 3 includes five general areas deserving detailed explanation. These areas are the cable entrance means 15 at the rearward end of each of the housings, individual cable termination adaptors 16 provided for each of the high voltage cables, the female and the male connector assemblies 5 and 10, the insulator support assembly 17 and both the check wire clamp assembly 18 and the ground connection assemblies 19.

The cable entrance means 15 is the same for either the female or male portion of the coupler and includes the cable clamp 20 to secure the polyphase cable assembly A to the cable housing 11. The cable entrance gland 21 is provided in the cable housing and chamber 22 to seal the rearward end of the cable housing 11 by means of the gasket slip ring 23 and the securing end cap 24. The cable assembly also includes the ground wire 25 and the ground check lead 26. As explained in greater detail hereinafter, the three sets of cables comprising the polyphase cable assembly A, that is, cables 2, 3, 4, 6, 7 and 8, are stripped of their outer layers in preparation of constructing cable termination as well as securing the appropriate connector to each of the cable conductors. Phase identification numbers displayed on both faces of the insulator support members 47 assures proper phase connection relationship between the conductors when assembled into the coupler 1.

Each of the cables shown in FIGS. 1 through 3 includes a central conductor 27 having an insulative covering 28 over which is provided a semiconductive layer 30 (FIG. 4) which is in turn covered by a metallic ground potential layer 31 which usually consists of shielding braid or wrapping. Each of the three sets of cables 2 and 3, 4 and 6, 7 and 8 is assembled together within the cable assembly sheathing or jacket 32.

Reference is now made to the check wire clamp assemblies 18 and the ground connection assemblies 19 which in connection with both FIGS. 2 and 3 are essentially the same except for the fact that in FIG. 2 there is provided a female ground contact 33, whereas in FIG. 3 there is provided the corresponding male ground contact 34. Likewise, there is provided in FIG. 2 the female ground check socket 35, whereas in FIG. 3 there is provided the male ground check contact 36. Other than this, these two assemblies shown in both figures are essentially the same wherein the ground connection assembly 19 includes a clamping stud 37 which is threadable within the housing 38 to force the clamp member 40 onto the ground wire 25 against the bottom of the housing 38. The ground check lead 26 is secured within the mounting contact 41 of the check wire assembly 18 which is connected to the ground check socket such as the female socket 35 or the male contact 36. By the same token, the forward ends of each of the ground wires or conductors 25 are secured to the corresponding female socket 33 and male contact 34 as shown respectively in FIGS. 2 and 3. The ground check conductors are added to afford some additional protection by monitoring the integrity of the ground conductor and in the event of unplanned energizing of the circuit to which the cable assembly is connected. In this connection, it can be readily noticed upon viewing of FIGS. 2 and 3 that upon connecting together the coupling housings 11 and 14, there is a sequential order in connection of ground contacts and phase contacts 5 and 10. This sequential order upon coupling is first, ground connection, i.e., male contact 34 engaging with female socket 33. Secondly, engagement of phase male contacts 10 with corresponding phase female sockets 5. Thirdly, engagement of ground check male contact 36 with its female socket 35. This sequential order is reversed upon disconnection of the coupling housings 11 and 14. Thus, there is always a clear ground connection prior to actual connection of the phase contacts of the cables and that connection is maintained until after disengagement of the phase contacts. Additionally, the circuit breaker cannot be closed until the ground check circuit is completed.

The female socket housing 13 is generally cylindrical in shape and, as previously indicated, is secured by means of the cap screws 12 to the outer forward flange 42 of the cable housing 11. The female socket housing 13 is provided with a plurality of threads 43 on its inner forward end for purposes of engagement with the rotatable ring assembly 44 supported on the male plug housing 45 secured to the forward end of the male cable housing 14. The ring assembly 44 in FIG. 3 is generally cylindrical in shape and its internal forward end is provided with a plurality of threads indicated at 46 for engagement with the external threads 43 of the female socket housing 13.

In general, the insulator support assembly 17 in both FIGS. 2 and 3 is generally the same except for one portion of the insulator tubes included in the assembly which will be explained in detail later. Referring initially to those portions of this assembly which are substantially identical in FIGS. 2 and 3, the insulator support assembly 17 includes the substantially rigid disc-shaped support member 47 which supports three tubular resilient insulators 48 (FIG. 2) or 66 (FIG. 3) by means of the annular recess 50 provided on the body of each of the insulators which is slipped into a corresponding opening 51 provided in the support member 47. The support member is made of insulative materials and is resilient but is substantially more rigid than the tubular insulators 48 and 66.

The tubular resilient insulators are highly resilient and are provided to be a track-free resistant material which is true for both assemblies 17 of FIGS. 2 and 3. The insulators are further supported in sustained relationship by means of the containment rings 126 slipped over their outer ends as illustrated in FIG. 1.

The tubular resilient insulators 48 of FIG. 2 are each provided with an inner passage and made up of essentially three sections. The rearward section 52 is provided with an inner frusto-conical surface 53 which tapers outwardly towards the rearward end 54 of the insulator 48. The central section 55 is provided with essentially an inner cylindrical bore 56 formed by the internal annular rib 64 while the forwardmost section 57 is provided with a slightly tapered bore 58. Most importantly, both of the sections 55 and 57 are provided with an outer frusto-conical surface 60 which is tapered from the shoulder 59 toward the forward end 61 of each of the insulators 48.

The female connector assembly 5 consists of the contact or connector 62 which is secured to the cable conductor 27 by conventional means such as by soldering, crimping or a Cadweld operation. The inner bore 56 of section 55 of each insulator 48 being formed by an internal annular rib 64, the contact 62 with the connected conductor 27 held within the bore 56 with its shoulder 63 seated against one side of the annular rib 64 and is secured in this position by means of the female lock nut 65 to hold the assembly tight on either side of the rib 64 to be completely supported within the insulator 48, as clearly illustrated in FIG. 2.

Reference is now made to FIG. 3, and in particular, to the insulator assembly 17 therein shown. For the most part, the assembly is identical to that as shown in FIG. 2 wherein the assembly 17 includes the insulative disc support member 47 for the purpose of supporting the tubular resilient insulators 66, similar to the tubular resilient insulators 48 in FIG. 2. The support member 47 is provided with a plurality of openings 51 within which the annular recess 50 of each of the insulators 66 are squeezed or otherwise forced into rigid support on the support member 47. There are also three sections making up each insulator 66, the first of which is the rearward section 67 provided with an inner frusto-conical surface 68, which tapers outwardly toward the rearward end of the insulator 66. The central section 70 of the insulator 66 is provided with an inner annular rib 71 which has a cylindrical bore 72. The forward section 73 of the insulator 66 is provided with an inner frusto-conical surface 74 which tapers outwardly toward the forward end 75 of the insulator 66. Also, the outer surface 76 of the forward section 73 is somewhat tapered as shown in FIG. 3, toward the forward end 75 of the insulator 66.

As in the case of the female connector 62 of FIG. 2, the male connector 77 of the male connector assembly 10 is secured to the conductor 27 by means of soldering, crimping or Cadweld operation. The male connector 77 is provided with a base or shoulder 78 which engages one side of the annular rib 71 of the central section 70 of the insulator 66 so that the connector 77 is supported within the annular bore 72 of the insulator. The connector 77 is secured in this position by means of the male annular lock nut 80 which engages the opposite shoulder of the annular rib 71 to securely lock the assembly 10 within the insulator 66.

From the foregoing discussion, it should be clear at this point that the male plug housing 45 is to be brought into engagement with the female socket housing 13 in a manner that the forward end of the male plug housing 45 will slip within the confines of the female socket housing 13 whereas the forward end 75 of each of the male insulators 66 will slip over the forward end 61 of each of the female insulators 48 so that the male tapered bore 74 will encompass and snugly engage upon the outer tapered surface 60 of the forward section 57 of the female insulator 48 when the forward end 75 of the male insulator 66 is brought into engagement with the shoulder 59 on the female insulator 48. At this point in time, it will be obvious that the male connector 77 will have its contact engaging member 81 located within the female connector bore 82 thereby electrically connecting the two particular high voltage cables together.

From the foregoing, it is readily clear that each of the insulator assemblies 17 of both FIGS. 2 and 3 are supported or secured into position upon connection of the cable housing 11 with the female socket housing 13 and the cable housing 14 with the male plug housing 45, respectively. Also, it should be clear that the female socket housing 13 can be readily used with cable housing 14 while male plug housing 45 can be joined with cable housing 11. Each of the housings 11 and 14 is provided with an annular shoulder or recess 83 whereas the housing 13 and 45 are provided at their rearward extent with a shoulder or annular recess 84. Upon securing these respective housings together, the disc support member 47 is supported within these annular recesses 83 and 84 as shown in FIGS. 2 and 3 and proper alignment of these housings upon such securement may be obtained by the employment of the dowel pins 85′, which penetrate slots or notches 170 in the perimeter of support members 47.

As previously explained, the closing ring assembly 44 is provided with a cylindrical threaded portion generally shown at 46 of FIG. 3 and is rotatably mounted on the anti-friction ring or sleeve 85 supported on the outer annular surface 86 which is formed by the contiguous connection of the rearward flange 88 of the male plug housing 45 and the forward flange 87 of the male cable housing 14. The flange 88 of the male plug housing 45 is secured to flange 87 by means of the cap screws 90. Also provided is a pair of anti-friction rings 91 on adjacent respective sides of the flanges 87 and 88 so as to ensure complete rotatable support of the closing ring assembly 44 on the contiguous annular flanges 87 and 88.

The closing ring assembly 44 is secured in its rotatable position by means of the employment of the ring follower 92 which is secured to the rearward extent of the closing ring assembly 44 by means of the cap screws 93. Thus, the cooling ring assembly 44 being rotatable about the housings 14 and 45, can be rotated to have its internal threaded section 46 threadably engage upon the external threaded section 43 of the female socket housing 13.

In order to ensure that the engagement of the two housings 11 and 13, as well as housings 14 and 45 is moisture-tight, a water or moisture seal ring 94 is provided at the connecting point of these respective housings. Also as shown in FIG. 3, an O-ring 95 is provided at the shoulder base 96 of the male plug housing 45 which is engaged by the forward end 97 of the female socket housing 13 to ensure complete sealing engagement between these housings and prevent moisture, water, or other undesirable foreign elements from possibly getting into the interior of the coupler assembly. In this connection, care should be taken to ensure that the forward end of locking ring 99 of the locking ring assembly 44 engages the stop or shoulder 89 of the female socket housing 13.

Each of the cable housings 11 and 14 is provided with a threaded aperture 98 into which may be inserted the plug member 100. The purpose of aperture 98 is to provide within the interior of these housings a filling compound to provide added protection to the final cable assembly as terminated within the coupler 1. In the past, asphalt type materials have been used but have been found undesirable, particularly in view of the fact that after such materials commence to harden within the coupler housing, shrinkage occurs and there is need for a final topping of the asphalt material to completely fill the chambers 101 of the respective housings 11 and 14 which in most cases inevitably produces or leaves undesirable voids or air spaces within these chambers.

In coupler designs of the past wherein there was incorporated glass polyester insulators, the stress relief structures were generally located closer to the cable entrance means and the asphaltic compound had to provide insulative reinforcement between the surface of the insulation of the conductors and ground, and between each of the insulated collectors per se. If a void were present in the spacing between the insulated conductors at a point forward of the rearwardly positioned stress relief cone, a breakdown could occur or a potential phase-to-phase fault could develop. However, a compound termed by the trademark "Coldpour" has been developed which can be poured at room temperature into the chamber 101 through the aperture 98 to protect the interior of the chamber and the assembled cables from moisture and environmental condition as well as provide extra insulation to the cable termination assembly, although extra insulation is no longer a significant requirement with respect to the coupler of the present invention, since the stress relief cone is actually positioned closer to the connector as compared to past structures and there is additional insulation provided at this forward point by the provision of the tubular insulators 48 and 66. Because of the improved set creepage paths as will be explained later, the shielding and cable terminus can be easily brought up closer to the actual cable conductor terminus region.

The material pours quite easily at room temperature so as to make a positive good seal within the crotch area 102 illustrated in connection with the cables 2, 3 and 4 of FIG. 2. This material also does not need a finishing topping or layer as in the case of asphalt type materials since it can be poured within the chamber 101 at room temperature completely filling the chamber and thereafter set in situ with only negligible shrinkage. The most important aspect of using this material has been to provide an excellent cushioning for rough handling of the coupler 1 and protect the cable terminations from any extensive damage. Also, the material has the property of being easily peeled off or away from the surfaces of the cable termination assemblies when and if necessary alterations or repair must be made to the cable terminations.

What remains to be discussed is the details of the construction concerning the cable termination adaptor 16, which is an important feature herein disclosed, and the manner and method of preparing and constructing a terminus between each of the cable layers as stripped from the end of the cable and the adaptor 16 positioned on the insulated conductor. In this connection, reference is made to FIG. 4 which shows in better detail the construction of the adaptor 16 and the termination assembly as applied thereto. As shown, the cable termination adaptor 16 has a central bore 103 which is slid over the insulative covering 28 of the conductor 27. In general, the adaptor 16 is provided with two body portions which are identified relative to the annular flange 104 of the adaptor. The entire body of the adaptor 16 is made up of resilient insulative material such as ethylene propylene compounds with a rearward or first portion 105 having an outer frusto-conical surface 106, the largest diametrical extent of which is at the annular edge 107 of the flange 104 and its smallest diametrical extent ending at the annular edge 108 of the rearward end 110 of the adaptor. This frusto-conical surface 106 has integrally bonded or vulcanized thereto a comparatively thin semiconductive resilient layer 111. This layer is preferably not less than one-hundred-thousandths of an inch thick and may be somewhat thicker. However, increase in thickness does not generally also increase or enhance the employment of the adaptor 16, particularly in connection with improvements relating to redistribution of electrical stresses, although fault current carrying properties are slightly enhanced. The semiconductive layer 111 forms the area of the stress relief cone which in essence is identified by the frusto-conical surface 106 of the adaptor 16.

Figures 4, 4A:
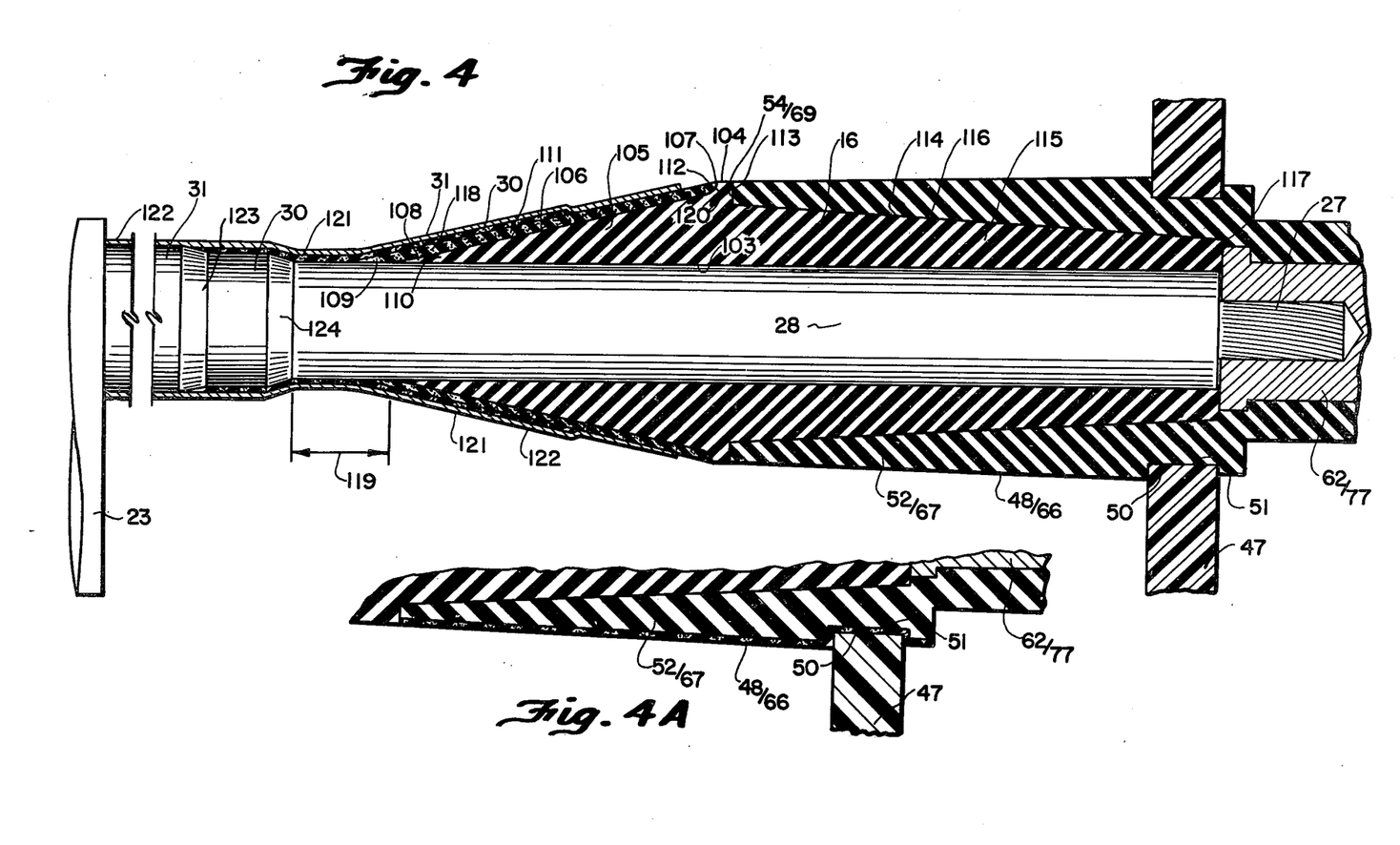
FIG. 4 is an enlarged view of the cable termination adaptor as secured within the insulator assembly illustrating in detail the manner in which the cable termination is constructed when employing the adaptor of this invention.
FIG. 4A is an enlarged sectional view of a modified form of the insulator shown in FIG. 4.

A very important aspect of the semiconductive layer is its feathered end points. By feathering, it is meant that the end points of the semiconductive layer diminish in thickness to a point which is contiguous at one end 112 with the annular edge 107 of the flange 104 and at the other end with the annular edge 108 of the adaptor body end 110 and extends therebeyond to the tip or point 109. This feathering is quite important with regard to uniform redistribution of the electrical stresses at the cable terminus as well as aiding in the prevention of the formation of voids or air pockets when constructing the cable terminus as disclosed herein. In particular, the end portion 112 adjacent to the flange 104 diminishes in layer thickness while at the same time is curved upwardly and away from the forward end 117 of the adaptor 16 which improves the redistribution of electrical stresses developed within the stress cone. Also, in connection with the forward end portion 112, the upper surface of the end portion 112 is very smooth and contiguous with the outer surface of the flange 104. In fact, the end portion 112 of the semiconductive layer 111 may even be directed slightly rearwardly so as to be hidden, so to speak, by the annular flange 104.

At this point, it should be noted that the annular flange 104 is an important function of the adaptor 16. The flange 104 has a forward annular shoulder 113 which engages the rearward end 54 or 69 of the respective insulators 48 or 66. Thus, this point of engagement determines in a preset manner the exact location of the stress relief cone 106 relative to the electrical connector 62 or 77. Also, the flange 104 increases the external creepage path 114, formed at the interface of the frusto-conical surfaces 53 or 68 and 116, by changing the directional extent of that path or generally blocking the path in combination with increasing its distance relative to the electrical connector and the semiconductor layer end portion 112. In this connection reference is made to the forward or other portion 115 of adaptor 16 which is provided with an outer frusto-conical surface 116 which tapers from the shoulder 113 of the flange 104 to the forward end 117 of the adaptor. The insertion of the adaptor 16 within the respective rearward section 52 or 67 of the respective insulator 48 or 66 will provide a tight, secure void-free interface at 114 due to the resiliency of the materials used in connection with the tubular insulators 48 and 66 and the adaptor 16. In this connection, it can be readily seen that the forward end 117 of the adaptor 16 seats against the respective contact 62 or 77 as connected to the cable conductor 27 so that the distantal relationship between the connector and the stress relief cone 106 is identical in connection with each and every cable terminus.

Reference is now made to the rearward end portion 110 of the adaptor 16. In reference particularly with FIG. 6A, it should be noted that the semiconductive layer 111 diminishes in layer thickness at the layer end portion 118 to the tip or point 107. A portion 118 of the layer 111 thus extends beyond the end portion 110 of the body 105 to be in engagement with the surface of the conductor insulation 28.

The unique structure of the termination adaptor 16 is found to have highly desirable improvements in electrical stress distribution throughout the stress cone 106 as well as provide an improved and more extensive creepage path between the rearward end portion 110 of the adaptor and the central conductor 27 and its corresponding connector 62 or 77. As previously indicated, one of the unique features of the adaptor 16 is the deliberate curve at the one end portion 112 wherein the layer 111 diminishes in thickness in the form of a taper generally designated at 120 in FIG. 4, which is hidden, so to speak, by the annular flange 104 and its annular outer edge 107. At the same time the annular flange 104 not only provides an increased resistive strength along the interface creepage path identified at 114, but also provides a preset guide for the installer in the field to obtain the desired exact fit for sealing the termination adaptor snugly within the end section 52 or 67 of the respective tubular insulators 48 and 66. From the foregoing, it should be therefore readily understood that not only does the provision of the vulcanized semiconductive layer 111 provide an increase in the external creepage path identified along the interface 114, and thus provide a projected higher corona inception level in the cable terminus, but also brings about both a better provision for electrical stress relief through the area of the cone 106 and at the same time directly provides for a proper dimensional creepage path along the interface 114 between the forward end 117 of the adaptor 16 and the annular edge 107 of its flange 104. This correctly dimensionalized creepage path is appropriate for all standard voltage classes with which the adaptor 16 may be employed in connection with any type of cable termination.

In this connection, it should be understood that the internal creepage path, which is defined along the bore 103 between the conductor connector 62 or 77, and the rearward end 110 of adaptor 16 is prescribed to have a definite relationship with the external creepage path defined along interface 114. In the construction of the termination adaptor 16 these two creepage paths defined at interfaces 103 and 114 are designed in a manner to be substantially equal in length or with interface 103 longer so as to minimize breakdown due to internal flashover. Thus, from the foregoing it should be quite clear to those familiar with the art that the termination adaptor 16 is not just for the provision of a stress relief cone at the area identified in FIGS. 4 and 5 at 106, but also is to provide the precise incorporation into the adaptor the required electrical balancing of the external and internal creepage paths thereby optimizing longitudinal/tangential stress parameters along each path.

Also, the adaptor 16 has the unique feature in that due to this equalization of the creepage paths, the adaptor can be universally employed in a variety of insulated structures wherein high voltage cables are used in couplers, splicing arrangements or permanent jointures facilitating desired standardization and hence simplification for installers. It should be noted that it is not absolutely necessary in such installations to employ the tubular insulator 48 or 66 in combination with the adaptor 16.

In FIG. 4A, a modified insulator is shown wherein the outer surface of the respective end sections 52 or 67 of the insulators 48 or 66 are provided with an integrally bonded outer semiconductive layer 99.

Figure 5:
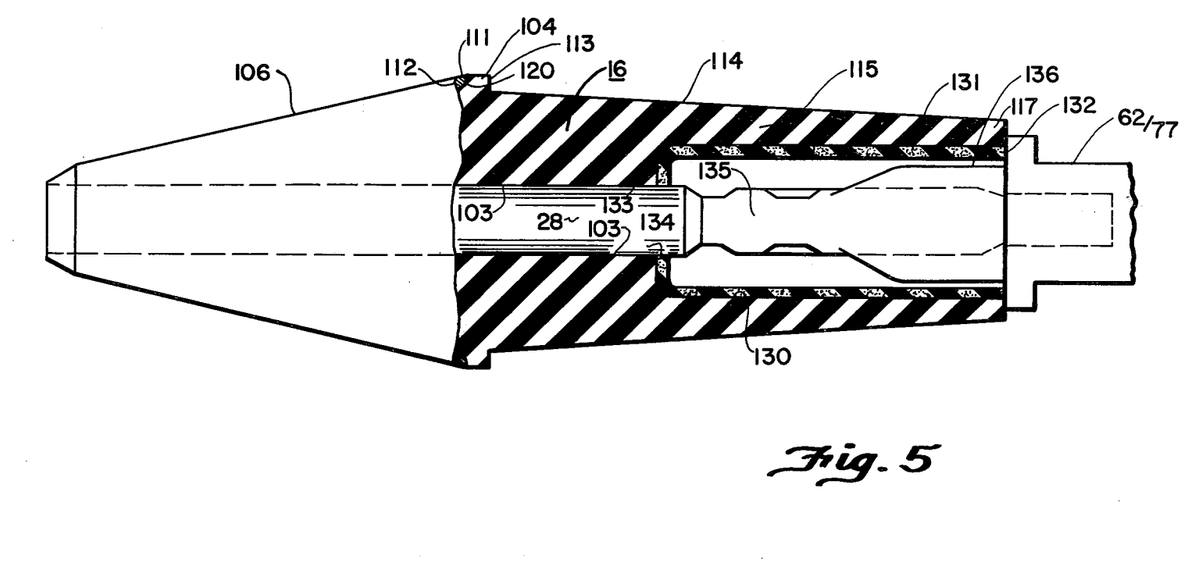
FIG. 5 illustrates a modified form of the cable termination adaptor of FIG. 4.

Reference is now made to FIG. 5 wherein is shown the termination adaptor 16 having a modified forward end portion 115. The structure shown is particularly suitable for aluminum high voltage cables having a central aluminum conductor. The forward end portion 115 is provided with an enlarged bore 130 in which there is provided a semiconductive insert 131 which is integrally bonded or otherwise vulcanized to the enlarged bore 130. The semiconductive insert 131 may also be substituted by a metallic insert having the same general configuration. The insert 131 is open at its forward end 132 but is provided at its rearward extent with a bottom 133 which has a centrally located aperture 134 in concentric alignment with the bore 103. It is through the aperture 134 that the insulated conductor is extended and the exposed forward end portion of the conductor 27 is connected to the male or female connector 62 or 77 by means of crimping as illustrated at 135 independently of or in combination with a Cadweld illustrated at 136. The provision of such an insert 131 has been found to improve corona performance without adversely affecting internal flashover because the creepage paths, previously described, are substantially equal.

Figure 6A:
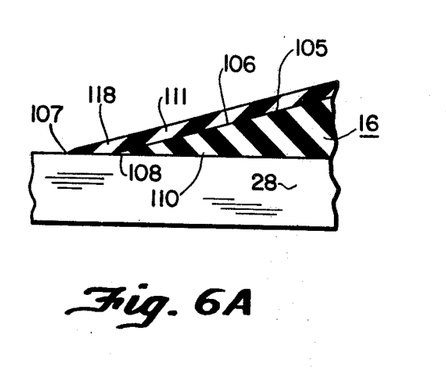
FIG. 6A is an enlarged sectional detail of the end portion of the termination adaptor inserted on the insulated conductor prior to the completion of cable wrapping termination.
Figure 6B:
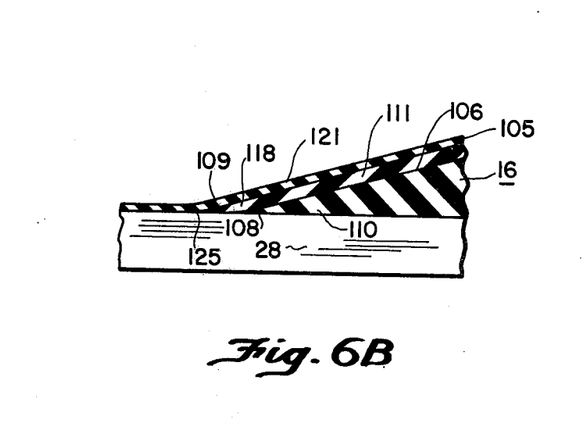
FIG. 6B is an enlarged sectional view of the end portion of the termination adaptor after the application of a single tape wrapping as applied over the shielded and insulated cable and adaptor.
Figure 6C:
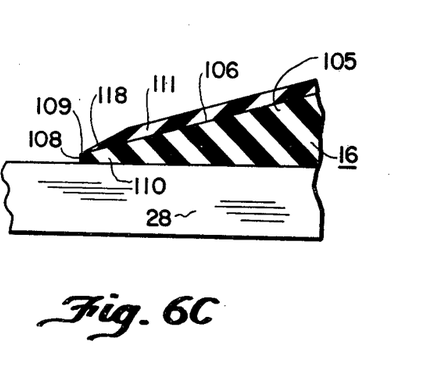
FIG. 6C is an enlarged sectional view of the end portion of a modified termination adaptor.

In FIG. 6C there is shown a modified end portion 110 of the adaptor 16 wherein the tip or point 109 of the semiconductive layer 111 does not extend beyond the end point 108 of the insulative body 105 but rather both end points 108 and 109 are contiguous.

Figure 8:
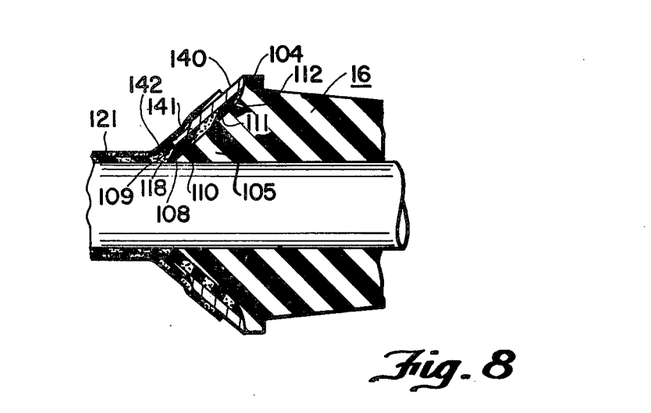
FIG. 8 is an enlarged sectional view of the end portion of a further modified termination adaptor.

A still further modified adaptor end portion 110 is shown in FIG. 8. Experiments have shown that improved corona extinction levels as well as improved creepage path length can be obtained by providing over the adaptor semiconductive layer 111 and outer frusto-conical insulative layer 140 which is integrally bonded or vulcanized directly over the semiconductive layer 111. The insulative layer at one end is feathered and bonded into the flange 104 and at its other end is tapered to a point 141 which is behind the end point 109 of the semiconductive layer 111. Thus, the semiconductive tape layer 121 extends over the end portion 118 of the semiconductive layer 111 for electrical engagement therewith. The outer insulative tape or protective layer 141 can be applied directly over layer 121 and a portion of the layer 140 as shown in FIG. 8.

Particular reference will now be made to the completion of a cable terminus showing either coatings, tape wrappings or heat shrinkable tubing in combination with the adaptor 16. In either case, wrapping or tubing is suitable in connection with the method of terminus disclosed. However, for purposes of simplification, reference will be made only to tape wrapping.

As will become evident, the termination adaptor 16 is located a distance from the termination of the metallic shield 31 of the cable as well as the semiconductive layer 30 beneath the metallic shield. This permits the use of closely conforming material such as semiconductive tape or heat shrinkable tubing to bridge the shielding termination and the semiconductive layer therebeneath and the point where the semiconductive portion or layer 111 commences at point 109 on the rearward end 110 of the termination adaptor 16. As in prior art methods of termination, it is highly desirable that the termination points of the metallic shield of the cable as well as its semiconductive layer 30 be tapered or pencilled as illustrated in an exaggerated manner at respective end points 123 and 124 in FIG. 4. In this manner, the provision of semiconductive coating or shrinkable tubing or overlapping semiconductor tape illustrated at 121 in FIG. 4 and the outer wrapping of metallic shielding 122 can provide void-free joints in the area of pencilling indicated at 123 and 124, and at the same time, as previously indicated, provide for more uniform concentricity as many shielded high voltage cables are not uniformly extruded or provided with complete perfect concentricity relative to the layers of material surrounding the internal conductor. The elimination of these layers and the addition at the adjoining area defined by arrow 119 between the terminus 123 and 124 of the layers 31 and 30 and the adaptor rearward end 110 of uniform layers of tape wrappings 121 and 122, a more uniformly concentric terminus will be obtained, particularly where the terminus must be constructed directly in the field where the high voltage cables are located.

Reference is again made to the fact that although in the illustration herein disclosed, mention is made that these layers 121 and 122 are tape wrappings, and it should be clearly understood that these layers could also be heat shrinkable tubing or a simple hand applied conductive type coating. For the matter of convenience, reference is being made only to tape wrapping. The steps of tape wrapping are merely substituted with steps of applying heat to shrink the tubing as applied at layers 121 and 122.

Reference is now made to both FIGS. 6A and 6B, which illustrate in greater detail the area in connection with the rearward extent or end 110 of the adaptor 16. In FIG. 6A the enlarged view of this area clearly illustrates the application of the adaptor 16 as applied over the insulated conductor. It will be seen that the rearward extent or end 110 is adjacent to the insulative covering 28 of the central conductor 27 and that the semiconductive layer end portion 118 is in contact with the surface of the conductor insulation 28. This area of the adaptor 16 is quite small in physical cross section so that when the first layer of tape wrapping, such as the semiconductive tape 121, is applied along the surface of the semiconductive layer 111 and down along the end portion 118 thereof onto the insulative covering 28, the tape is wrapped under slight tension thereby placing a squeeze or state of compression on the end point 118 as well as the end 110 of the adaptor 16. This state of compression is illustrated in FIG. 6B wherein the semiconductive tape 121 which is applied in a spiral manner over this edge or point 118 provides a tight void-free joint with the insulation covering 28 as illustrated at 125. This is an important feature in connection with the method of terminus disclosed herein which is facilitated by an adaptor 16 having just one bore throughout and at the same time providing stress relief and sealing of the surface 28 of the insulated conductor.

Figure 7:
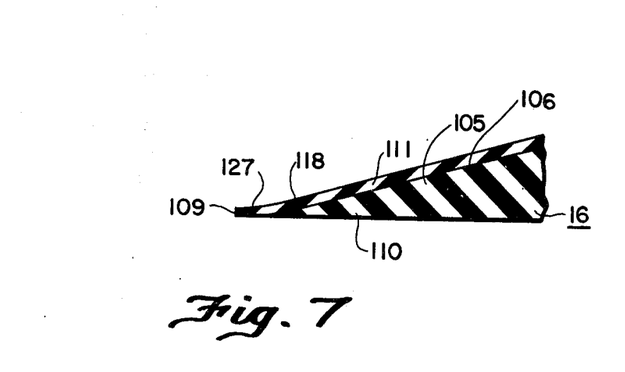
FIG. 7 is an enlarged sectional view illustrating the end portion of a still further modified termination adaptor.

In this connection a further modification of the end portion 110 adaptor is shown in FIG. 7 wherein there is provided an extremely thin but substantially cylindrically shaped portion 127, which is an extension of the end portion 118 of the semiconductive layer 111. This portion 127 is extremely small in thickness and may be as small as two-thousandths of an inch. It is obvious that this embodiment will provide a very smooth void-free contiguous connection between the rearward extent of the adaptor 16 as applied to the insulated covering 28 of a high voltage cable, particularly upon application of the layers or tape wrapping 121 and 122.

The following procedure is generally followed in preparing and constructing a cable terminus which is the feature of this invention.

In this first instance, the cable jacket or covering 32 is removed from the cable for a predetermined distance, which distance is greater than the length of the termination adaptor 16. Next, the metallic shield 31 of the cable is removed up to a short distance from the terminus of the jacket 32 which is generally indicated at 123 in FIG. 4. Next, the semiconductive layer 30 of the cable is removed from the insulated covering 28 up to a point near the terminus 123 of the metallic shield 31 such as the point indicated at 124 in FIG. 4. Tapering as indicated at these points 123 and 124 is highly desirable.

Next, the termination adaptor 16 is slid over the insulated covering 28 of the cable to a point which will permit exposure of the extreme forward end of the terminated conductor. In placing the termination adaptor 16 on the insulative covering 28, the latter may be coated with silicone grease to provide not only ease of insertion but also remove the possibility of any voids or air pockets developing at the interface 103. The forward end of the cable conductor should be exposed in preparation for soldering or otherwise crimping a connector onto the conductor and, at this point of time, a portion of the insulated covering 28 is removed from the forward end of the conductor 27.

Mention should be made that no silicone grease should be caused to come in contact with the semiconductive layers 30 and 111. By the same token, prior to insertion of the termination adaptor 16 on the insulative covering 28, a solvent should be used to remove any traces of semiconductive material or other contaminants that may be present on the insulative covering 28.

After the connector 62 or 77 has been secured to the conductor 27, the termination adaptor 16 is moved forward so that its forward end 117 engages the rearward end of the conductor connector. Silicone grease may be applied along the surfaces representing the interface 114 for providing easy insertion of the adaptor portion 115 into the insulator as well as aiding in the elimination of any voids or air pockets within the interface 114.

At this time any silicone grease in the area between the rearward extent 110 of the adaptor 16 and the tapered forward end 124 of the semiconductive layer is removed through the use of a suitable solvent. After this area is thoroughly dry, then the process of tape wrapping to complete the cable termination can be accomplished. In the application of heat shrinkable tubing, the tubing assembly is placed on the cable prior to the step of inserting the adaptor 16 onto the insulated covering.

Under general circumstances, the semiconductive tape wrapping 121 is started part way up the surface of the semiconductive layer 111 as illustrated in FIG. 4 and is continued downwardly along the surface of layer 111 usually and continuously in a half-lap layer style under slight tension. The wrapping is continued along the exposed insulative covering 28 of the cable identified by arrow 119 and thence over the semiconductive layer 30 up to the metallic cable shield 31 at point 123 in FIG. 4.

The metallic wrapping 122 is then applied starting from the terminus of the cable jacket 32 along the exposed portion of the metallic shield 31, thence along over the already applied semiconductive tape layer 121 and thence upward along the cone 106 over the semiconductive tape layer 121 and is terminated at some point beyond the initial end of the semiconductive tape layer 121 on the cone 106. The metallic shield wrapping may be brought up to terminate at the annular edge 107 of the flange 104, although this is not necessary.

Although not shown, outer insulative tape wrapping or shrinkable tubing may not be applied over the metallic shield wrapping 122 to completely cover and protect the cable terminus as constructed. Experiments have shown that improved corona extinction levels can be maintained when such insulative layers are provided up to the flange edge 107 and this is why the modified adaptor structure of FIG. 8 is so successful.

From the foregoing explanation, it should be clear that the provision of the termination adaptor 16 herein disclosed in combination with the method of termination relative to the outer semiconductive and metallic layers of the high voltage cable provides a universal and improved high voltage cable termination not previously known. In the first instance, an improved stress relief cone 106 is provided particularly in connection with the provision of a homogeneous or otherwise vulcanized outer semiconductive layer 111 of extremely thin thickness provided with feathered end portions at 112 and 118. The end portion 112 is terminated in an outwardly tapered manner as illustrated at 120 in FIG. 4 behind the annular flange 104 thereby having effective advantage of increasing the external creepage path 114. Likewise the other end portion 118 is constructed in a manner as illustrated in particular in connection with FIG. 6B to provide a tight void-free joint upon application of semiconductive layer 121 and the outer metallic shielding layer 122 in completing the cable termination construction. Guesswork is not necessary with respect to the proper positioning of the stress relief cone 106 relative to the electrical contact connector connected to the central conductor of the cable since distance is no longer critical. Also, there is no guesswork with regard to the precise amount of stripping necessary in connection with the semiconductive and metallic shielding layers of the high voltage cable as the termination adaptor 16 is not constructed to be in engagement or otherwise contacting either of these layers, which is true with adaptors of the prior art. Although there may be some area 119 between the rearward extent 110 of the adaptor 16 and the strip terminus point 124 of the semiconductive layer, this is easily bridged by a tightly conforming material such as self-bonding semiconductive tape or heat shrinkable semiconductive tubing. In practice, even loosely applied semiconductive tape has been shown to give consistently high corona extinction levels. Upon employment of the semiconductive and conductive layers 121 and 122 as a means for connecting the ends of the cable semiconductive layer 30 and the cable metallic shield 31, respectively, with the semiconductive layer 111 provided on the stress relief cone 106, it is virtually impossible to include any voids or air pockets during the formation of these layers 121 and 122 particularly since no end portion of the adaptor 16 is in contact with or in engagement over the cable conductive layers as was the case in the prior art. Rather, the adaptor is separated therefrom by a distance defined by arrow 119. The peeling or otherwise stripping away of the layers 30 and 31 of the cable reduces the diameter of the terminus point of the connection so that a more uniform stress relief zone may be provided in combination with the termination adaptor 16. Obviously, a cable termination adaptor which is applied directly over the insulative layer and not both the semiconductive layer and insulative layer of the high voltage cable does not depend upon or aggravate the eccentricity problems found in many of today's high voltage cables as compared to termination adaptors attempting to accommodate both layer diameters.

It also should be noted that the tubular insulators 48 and 66 are constructed of track resistant material with no parting lines or seams on their inner surfaces so as to reduce the risk of tracking, that is, producing minute elongated grooves on the inner surfaces 53 and 68 of these tubular insulators which reduce the effectiveness of the creepage path and increasing the liability of possible flashover. By using materials described herein one can optimize a variety of design criteria such as dielectric strength, track resistance, corona and ozone resistance, resistivity, etc., thereby providing added protection against dielectric breakdown in the area of the cable termination.

We claim:

1. A cable termination adaptor comprising in combination an insulating elastomeric tubular body defining a bore for the insertion of an insulated electrical conductor and having on one end portion thereof a frusto-conical outer surface with the smallest diametrical extent of said frusto-conical surface terminating at an outside end of said body; an annular flange formed on said body at the largest diametrical extent of said frusto-conical surface; a semiconductive elastomeric frusto-conical layer integrally bonded on said surface and having a large and a small annular end edge with the larger annular edge thereof contiguous with a perimetric edge of said flange and the smaller annular edge thereof flared to a point ending beyond said outside end of said body; an electric transmission cable having a covering layer containing conductive shielding properties which overlies an insulative covered conductor with a portion of said conductive shielding stripped from the terminal end of said cable leaving an exposed terminal end of insulative covered conductor; said exposed terminal end received in said bore with a portion of said insulative covering being permissibly exposed between said flared smaller annular edge of said semiconductive elastomeric frusto-conical layer and the terminus of said cable covering layer; and a layer of shielding material having metallic properties snugly covering without voids over the combination of a terminus portion of said cable covering layer and said permissibly exposed cable insulation layer and a portion of said semiconductive elastomeric frusto-conical layer at the smaller annular end thereof without gaps.

2. The cable termination adaptor of claim 1 characterized in that said flange has an outer cylindrically shaped surface, said larger annular end edge of said layer gradually diminishing in thickness to a point wherein it is contiguous with the perimeter of said flange.

3. The cable termination adaptor of claim 1 characterized in that the general thickness of said layer is not substantially less than 0.1 inch.

4. The cable termination adaptor of claim 1 characterized in that said outside end of said body together with said smaller annular edge of said overlying layer is readily contractable to form a continuous smooth joint with said insulated conductor when inserted in said bore.

5. The cable termination adaptor of claim 1 characterized in that said layer and body at said smallest diametrical extent terminate in two integrally bonded cylindrically shaped surfaces of extenuated thickness.

6. The cable termination adaptor of claim 1 characterized by a second frusto-conical outer surface forming the remaining portion of said tubular body tapered inwardly in a direction away from said annular flange.

7. The cable termination adaptor of claim 6 characterized by a metallic tubular member inserted within said body in said remaining body portion.

8. The cable termination adaptor of claim 6 characterized by a semiconductive tubular member within said bore in said remaining body portion.

9. The cable termination adaptor of claim 6 characterized by a cylindrically shaped chamber concentrically within said bore in said remaining body potion and larger in diametrical extent than the remainder of said bore, a semiconductive tubular member vulcanized within said chamber and consisting of a tubular-shaped member with its outwardly extended end open and having a bottom in its innermost end in said bore with a central aperture concentric with said bore.

10. An adaptor for employment in the terminus of a high voltage cable comprising an elongated insulative elastomeric body portion having a concentrically located bore; an outer annular flange located intermediate of said body portion and being the largest diametrical extent thereof, frusto-conical surfaces on both sides of said flange and tapered away therefrom toward said central bore; a semiconductive elastomeric layer vulcanized on one of said tapered surfaces and having end extremities of diminishing layer thickness to a point wherein one end extremity is contiguous with said flange and the other end extremity is extended beyond the end of said body portion adjacent said bore; an electric transmission cable having a covering layer containing conductive shielding properties which overlies an insulative covered conductor with a portion of said conductive shielding stripped from the terminal end of said cable leaving an exposed terminal end of insulative covered conductor; said exposed terminal end received in said bore with a portion of said insulative covering being permissibly exposed between said other end extremity of said semiconductive elastomeric frusto-conical layer and the terminus of said cable layer containing conductive shielding properties; and a layer of shielding material having metallic properties snugly covering without voids over the combination of a terminus portion of said cable layer containing conductive shielding properties, said permissibly exposed cable insulation layer, and a portion of said semiconductive elastomeric tapered layer at the smaller diametrical end thereof.

11. The adaptor of claim 10 characterized in that said one end extremity of said layer is tapered outwardly away from said central bore ending at a point contiguous with an annular edge of said flange.

12. The adaptor of claim 10 characterized by an enlarged central bore provided within the end of said body portion opposite to that of said layer and concentrically located relative to said bore forming an annular shoulder therebetween, a semiconductive insert seated and vulcanized within said enlarged bore having a bottom vulcanized to said shoulder with a central aperture identical in size with said bore.

13. The adaptor of claim 10 characterized by a cylindrically shaped thin layer forming said other end extremity extending beyond said body end.

14. The adaptor of claim 10 characterized by a frusto-conical insulative elastomeric layer vulcanized on said semiconductive elastomeric layer and having end extremities of diminishing layer thickness to a point wherein one end extremity is contiguous with said flange and the other end extremity is adjacent to the terminus of said semiconductive layer other extremity.

15. The adaptor of claim 10 characterized in that said semiconductive layer other extremity of said layer is contiguous with the outer annular edge of said bore.

16. A high voltage cable coupler for releasably connecting together one or more high voltage cables having a concentrically located, insulated conductor comprising a female coupling joint and a male coupling joint; each of said joints including in combination a cable housing with a cable entrance means at its rearward extent; a coupling housing connected to the forward point of said cable housing; an insulator support assembly secured into position by said connected housings and including in combination at least one tubular resilient insulator together with means to support said insulator within said housing; an electrical connector secured to each terminal end of said conductor; a cable termination adaptor positioned on said insulated conductor contiguous with said connector including in combination an insulating elastomeric tubular body having a rearward portion with an outer frusto-conical section with the smallest diametrical extent thereof forming one end of said body; an annular flange formed at the largest diametrical extent of said frusto-conical section; a semiconductive elastomeric frusto-conical shaped layer integrally bonded on said frusto-conical section with one end thereof diminishing in layer thickness to a point contiguous with said flange and the other end diminishing in layer thickness to a point extending beyond the circular edge formed by said body end; an electric transmission cable having a covering layer containing conductive shielding properties overlying an insulative covered conductor with a portion of said conductive shielding stripped from the terminal end of said cable leaving an exposed terminal end of insulative covered conductor; said exposed terminal end received in said bore with a portion of said insulative covering being permissibly exposed between said diminishing point of said semiconductive elastomeric frusto-conical layer and the terminus of said cable layer containing conductive shielding properties; and a layer of shielding material having metallic properties snugly covering without voids over the combination of a terminus portion of said cable layer containing conductive shielding properties, said permissibly exposed cable insulation layer, and a portion of said semiconductor elastomeric frusto-conical layer at the smaller diametrical end thereof.

17. The high voltage cable coupler of claim 16 characterized by closing ring assembly rotatably mounted on one of said coupling joints for locking said joints together when said coupling housings have been brought into engagement.

18. The high voltage cable coupler of claim 16 characterized in that said tubular body includes a forward portion for insertion into one end of said tubular resilient insulator and means to secure said conductor connector within the interior of said insulator.

19. The high voltage cable coupler of claim 18 characterized by a semiconductive tubular insert vulcanized within said bore at said forward portion.

20. The high voltage cable coupler of claim 18 characterized by an outer tapered conically shaped surface provided on said forward portion, a mating inner tapered conically shaped bore within said tubular insulator, said adaptor forward portion insertable within said tubular insulator with the end of said insulator in engagement with said annular flange.

21. The high voltage cable coupler of claim 18 characterized by an internal annular rib provided in the bore of said tubular insulator, said connector securing means including a shoulder on one end of said connector engaging one side of said rib and a locking member releasably secured to the other end of said connector and engaging the opposite side of said rib to secure said connector to said rib.

22. The high voltage cable coupler of claim 16 characterized by disc support member comprising said insulator support means and having at least one opening within which said tubular insulator is positioned.

23. The high voltage cable coupler of claim 22 characterized by an annular groove in said insulator for supporting said insulator in said support member opening.

24. The high voltage cable coupler of claim 22 characterized by three annular openings in said annular support member for supporting three tubular insulators in a polyphase cable coupler housing.

25. The high voltage cable coupler of claim 24 characterized by a retainment ring provided with three apertures receivable on the ends of said tubular insulators to hold the latter in spaced relation relative to said disc support member.

* * * * *